United States Patent
Yamauchi et al.

(10) Patent No.: US 9,257,091 B2
(45) Date of Patent: Feb. 9, 2016

(54) IN-VEHICLE DISPLAY DEVICE, METHOD FOR DISPLAYING IMAGE INFORMATION OF MOBILE INFORMATION TERMINAL ON VEHICULAR DISPLAY, AND NON-TRANSITORY TANGIBLE COMPUTER-READABLE MEDIUM FOR THE SAME

(71) Applicant: DENSO CORPORATION, Kariya, Aichi-pref. (JP)

(72) Inventors: Hideaki Yamauchi, Kiyosu (JP); Kenji Miyake, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/405,373

(22) PCT Filed: May 21, 2013

(86) PCT No.: PCT/JP2013/003216
§ 371 (c)(1),
(2) Date: Dec. 3, 2014

(87) PCT Pub. No.: WO2013/183239
PCT Pub. Date: Dec. 12, 2013

(65) Prior Publication Data
US 2015/0194124 A1  Jul. 9, 2015

(30) Foreign Application Priority Data
Jun. 6, 2012 (JP) .................... 2012-128940

(51) Int. Cl.
*G09G 5/00* (2006.01)
*G06F 3/041* (2006.01)
*H04M 1/60* (2006.01)
*H04W 52/02* (2009.01)
*B60K 35/00* (2006.01)
*G06F 1/32* (2006.01)
*H04M 1/725* (2006.01)

(52) U.S. Cl.
CPC *G09G 5/00* (2013.01); *B60K 35/00* (2013.01); *G06F 1/3265* (2013.01); *G06F 3/041* (2013.01); *H04M 1/6083* (2013.01); *H04W 52/027* (2013.01); *B60K 2350/352* (2013.01); *G09G 2330/021* (2013.01); *G09G 2380/10* (2013.01); *H04M 1/72527* (2013.01); *Y02B 60/50* (2013.01)

(58) Field of Classification Search
CPC ............... G06F 1/32–1/3234; G06F 1/325; G06F 1/3262; G06F 1/3265; G06F 3/041; G09G 5/00; G09G 2330/02–2330/022; G09G 2330/027; G09G 2380/10; B60K 35/00; B60K 37/00–37/06; B60K 2350/35; B60K 2350/352; H04M 1/6033–1/6091; H04M 1/72519–1/72527; H04W 52/0261–52/0283; Y02B 60/50
See application file for complete search history.

(56) References Cited

U.S. PATENT DOCUMENTS

| | | | |
|---|---|---|---|
| 2003/0156097 A1 | 8/2003 | Kakihara et al. | |
| 2012/0253597 A1* | 10/2012 | Nada | H04M 1/72533 701/36 |
| 2014/0104082 A1* | 4/2014 | Nakamura | G06F 1/3212 340/995.15 |

FOREIGN PATENT DOCUMENTS

| | | | | |
|---|---|---|---|---|
| JP | 2002290320 A | 10/2002 | | |
| JP | 2003244343 A | 8/2003 | | |
| JP | 2006157747 A | 6/2006 | | |
| JP | WO 2013042161 A1 * | 3/2013 | ............ | G06F 1/3212 |

OTHER PUBLICATIONS

International Search Report and Written Opinion (in Japanese with English Translation) for PCT/JP2013/003216, mailed Jul. 30, 2013; ISA/JP.

* cited by examiner

*Primary Examiner* — Nathan Danielsen
(74) *Attorney, Agent, or Firm* — Harness, Dickey & Pierce, P.L.C.

(57) ABSTRACT

An in-vehicle display device communicates with a mobile information terminal and displays image information of the mobile information terminal on a vehicular display. The in-vehicle display device includes: a mode detecting device that detects whether the mobile information terminal is in a normal operation mode or a power saving mode; and a display control device that changes a display mode of the vehicular display from a normal display mode to a power saving display mode for reducing an electric power consumption relating to the image display under a condition that the mobile information terminal is switched from the normal operation mode to the power saving mode.

7 Claims, 3 Drawing Sheets

IN-VEHICLE DISPLAY DEVICE, METHOD FOR DISPLAYING IMAGE INFORMATION OF MOBILE INFORMATION TERMINAL ON VEHICULAR DISPLAY, AND NON-TRANSITORY TANGIBLE COMPUTER-READABLE MEDIUM FOR THE SAME

CROSS REFERENCE TO RELATED APPLICATIONS

This application is a U.S. National Phase Application under 35 U.S.C. 371 of International Application No. PCT/JP2013/003216 filed on May 21, 2013 and published in Japanese as WO 2013/183239 A1 on Dec. 12, 2013. This application is based on and claims the benefit of priority from Japanese Patent Application No. 2012-128940 filed on Jun. 6, 2012. The entire disclosures of all of the above applications are incorporated herein by reference.

TECHNICAL FIELD

The present disclosure relates to an in-vehicle display device communicably coupled with a mobile information terminal such as a cell phone and displaying an image, which is displayed on a screen of the mobile information terminal, on a display mounted on a vehicle, a method for displaying image information of the mobile information terminal on a vehicular display, and a non-transitory tangible computer-readable medium for the same.

BACKGROUND ART

Recently, a technique for coupling between an in-vehicle information device and a mobile information terminal such as a smart phone via communication in cooperation with each other becomes popular (for example, a terminal mode, a name of which is changed to a mirror link (registered trademark) afterwards). An information display system described in Patent Literature No. 1 is well-known as this type of technique. In the information display system, display data displayed on a screen of a cell phone is supplied to an in-vehicle device, so that the display data is displayed on a display of the in-vehicle device. Further, a touch switch of the cell phone is displayed on the display of the in-vehicle device, and it is possible to operate the cell phone from the in-vehicle device using the touch switch.

The above technique provides to utilize a function of the mobile information terminal in the in-vehicle information device such that, for example, in the in-vehicle information device not having a navigation function, a map image provided by the navigation function of the mobile information terminal is displayed on the display of the vehicle.

Here, the mobile information terminal such as the smart phone may have a power saving mode for reducing electric power consumption in order to extend a working time of a built-in battery by limiting a part of the functions compared with a normal mode operation. The main functions of the above power saving mode include a function for reducing the electric power consumption by limiting the display operation of the display. For example, when no operation is performed for a predetermined time interval, the mobile information terminal is switched to the power saving mode, and the image display operation is terminated.

However, when the mobile information terminal stops displaying an image due to the power saving mode, the in-vehicle information device, which has displayed the image in cooperation with the mobile information terminal, has a problem of a waste of consuming the electric power because the in-vehicle information device continues operating the display even if the device lacks the image to be displayed. Specifically, it is very important to save an electric power for a vehicle such as an electric vehicle a hybrid vehicle and a plug-in hybrid vehicle, which runs with an electric power accumulated in a secondary battery. Thus, it is necessary to contrive a way for reducing the waste of electric power consumption.

However, in a conventional technique described in Patent Literature No. 1, the above described problem cannot be solved since it is not considered that the display operation of the display on the vehicle side is limited in cooperation with the in-vehicle information device when the mobile information terminal is switched to the power saving mode.

PRIOR ART LITERATURES

Patent Literature

Patent Literature 1: JP-A-2003-244343

SUMMARY OF INVENTION

It is an object of the present disclosure to provide an in-vehicle display device communicably coupled with a mobile information terminal such as a cell phone and displaying an image on a display mounted on a vehicle, the image being displayed on a screen of a mobile information terminal. Further, it is another object of the present disclosure to provide a non-transitory tangible computer-readable medium for displaying image information to be input from the mobile information terminal on a vehicular display mounted on the vehicle. Further, it is another object of the present disclosure to provide a method for displaying the image information to be input from the mobile information terminal on the vehicular display mounted on the vehicle. Specifically, when the image of the mobile information terminal is displayed via the in-vehicle information device, the electric power consumption of the in-vehicle display device in the in-vehicle information device is restricted in association with the mobile information terminal, which switches to the power saving mode.

According to a first aspect of the present disclosure, an in-vehicle display device is communicably coupled with a mobile information terminal and displays image information input from the mobile information terminal on a vehicular display mounted on a vehicle. The in-vehicle display device includes: a mode detecting device that detects whether the mobile information terminal is in a normal operation mode or a power saving mode for reducing an electric power consumption relating to image display; and a display control device that changes a display mode of the vehicular display from a normal display mode to a power saving display mode for reducing an electric power consumption relating to the image display according to a detection result of the mode detecting device under a condition that the mobile information terminal is switched from the normal operation mode to the power saving mode.

In the above in-vehicle display device, the in-vehicle display device is switched to the power saving display mode for reducing the electric power consumption of the vehicular display in association with the mobile information terminal, which is communicably connected to the in-vehicle display device and switched to the power saving mode. Thus, the waste electric power consumption such that the vehicular display in association with the mobile information terminal continues to function although the mobile information terminal stops displaying the image according to the power saving mode is reduced.

According to a second aspect of the present disclosure, a non-transitory tangible computer readable medium includes instructions for execution by a computer. The instructions provides a computer-implemented method for displaying image information input from a mobile information terminal on a vehicular display mounted on a vehicle. The instructions includes: detecting whether the mobile information terminal is in a normal operation mode or a power saving mode for reducing an electric power consumption relating to image display; and changing a display mode of the vehicular display from a normal display mode to a power saving display mode for reducing an electric power consumption relating to the image display under a condition that the mobile information terminal is switched from the normal operation mode to the power saving mode.

In the above non-transitory tangible computer readable medium, it is possible to switch to the power saving display mode for reducing the electric power consumption of the vehicular display in association with the mobile information terminal, which is communicably connected to the in-vehicle display device and switched to the power saving mode. Thus, the waste electric power consumption such that the vehicular display in association with the mobile information terminal continues to function although the mobile information terminal stops displaying the image according to the power saving mode is reduced.

According to a third aspect of the present disclosure, a method for displaying image information input from a mobile information terminal on a vehicular display mounted on a vehicle, includes: detecting whether the mobile information terminal is in a normal operation mode or a power saving mode for reducing an electric power consumption relating to image display; and changing a display mode of the vehicular display from a normal display mode to a power saving display mode for reducing an electric power consumption relating to the image display under a condition that the mobile information terminal is switched from the normal operation mode to the power saving mode.

In the above method, it is possible to switch to the power saving display mode for reducing the electric power consumption of the vehicular display in association with the mobile information terminal, which is communicably connected to the in-vehicle display device and switched to the power saving mode. Thus, the waste electric power consumption such that the vehicular display in association with the mobile information terminal continues to function although the mobile information terminal stops displaying the image according to the power saving mode is reduced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

An embodiment of the present disclosure will be explained with reference to drawings as follows. Here, the present disclosure is not limited to the following embodiment. Alternatively, the present disclosure can be applied to various aspects.

(Explanation of a Constitution of an in-Vehicle Display Device 1)

Figure 1:
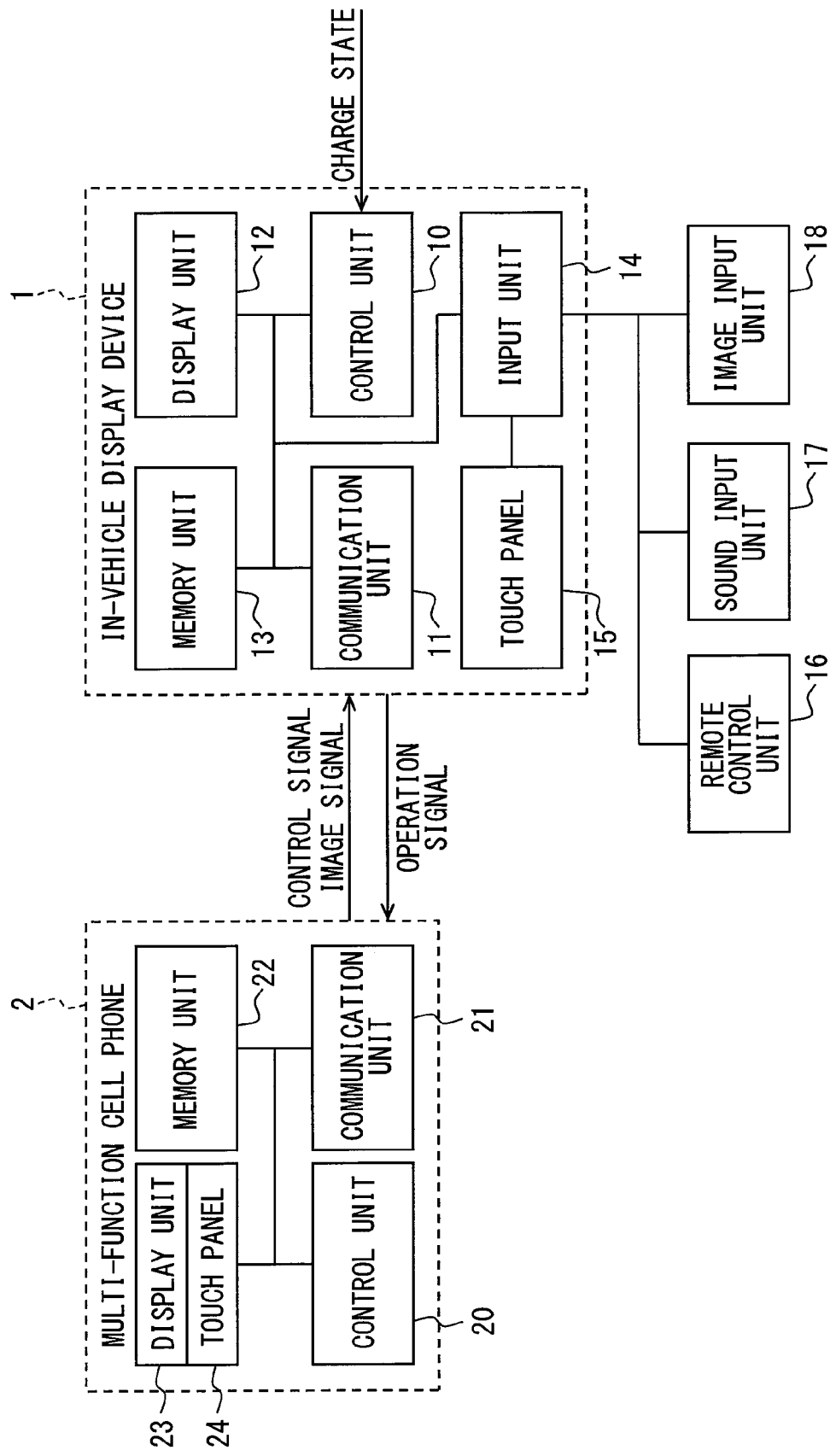
FIG. 1 is a block diagram showing an overview constitution of an embodiment.

The in-vehicle display device 1 according to the embodiment is a control device as a part of an image display system mounted on the vehicle. For example, the device 1 may be provided by a vehicular navigation device, a media player for an image and a sound or the like. As shown in FIG. 1, the in-vehicle display device 1 includes a control unit 10, a communication unit 11, a display unit 12, a memory unit 13, an input unit 14, a touch panel 15 and the like. Further, the input unit 14 of the in-vehicle display device 1 is connected to a remote control unit 16, a sound input unit 17 and an image input unit 18, which are arranged in a vehicle.

The control unit 10 is a processing unit having a CPU, a ROM, a RAM, an input/output interface and the like, which are not shown in the drawings. The control unit 10 totally controls each element of the in-vehicle display device 1. The control unit 10 executes a process relating to an image display based on a program and data, which are read out from the ROM and the memory unit 13. Further, the control unit 10 is communicably connected to various ECUs (electronic control units), which are mounted on the vehicle. The control unit 10 obtains information (such as a charge state of a secondary battery) relating to a control of the vehicle from the ECUs.

Further, the control unit 10 is communicably connected to the multi-function cell phone 2 via the communication unit 11, so that the control unit 10 is capable of executing a terminal mode for functioning in cooperation with each other. The terminal mode includes a function for displaying and magnifying the image, which is displayed on the multi-function cell phone 2, on the display unit 12 of the in-vehicle display device 1. Further, the control unit 10 executes a process based on the control signal supplied from the multi-function cell phone 2. As an example, the control unit 10 displays an operation command based on the control signal supplied from the multi-function cell phone 2 on the display unit 12 of the in-vehicle display device 1. When an operation of the user is input via the input unit 14 according to the operation command, a corresponding operation signal is transmitted to the multi-function cell phone 2. Further, the control unit 10 executes the power saving display mode in conjunction with the power saving mode, which is executed by the multi-function cell phone 2. Detailed steps of the process relating to the power saving display mode will be explained later.

The communication unit 11 is a communication interface for communicating data between the multi-function cell phone 2 carried by a passenger of the vehicle and the communication unit 11. In the present embodiment, the communication unit 11 may provide to execute a wireless communication compliant with predetermined short-range wireless communication standards (for example, Bluetooth (registered trademark) and wireless LAN) or a wired communication compliant with predetermined communication standards (for example, USB (universal serial bus) and HDMI, i.e., high-definition multimedia interface (registered trademark)).

The display unit 12 is a color display device having a display screen such as a liquid crystal display panel. The display unit 12 displays an image output from an image device (not shown in the drawings) mounted on the vehicle and an image based on image information transmitted from the multi-function cell phone 2. The memory unit 13 is a storing device provided by a hard disk drive, a rewritable non-volatile semiconductor memory or the like. The memory unit 13 stores a program and data for functioning the in-vehicle display device 1.

The input unit 14 is an input interface for processing operation information from various input devices such as the touch panel 15, the remote control unit 16, the sound input unit 17 and the image input unit 18 and for inputting the operation information into the control unit 10. The touch panel 15 is a pointing device arranged integrally with the display screen of the display unit 12. The touch panel 15 detects information of a screen point, which is touched by the user, and outputs as operation information. The remote control unit 16 is an input device such as a steering wheel switch and a haptic device for remotely controlling the in-vehicle display device 1 from a position, at which the user easily operates the unit 16. The sound input unit 17 is a voice input device for inputting a voice of the user as the operation information with respect to the in-vehicle display device 1. The image input unit 18 is an image input device for inputting an image of a gesture and the like of the user as the operation information with respect to the in-vehicle display device 1.

The multi-function cell phone 2 is a mobile information terminal such as a smart phone, which has a function of a cell phone and a function of a personal computer. The multi-function cell phone 2 includes the control unit 20, the communication unit 21, the memory unit 22, the display unit 23, the touch panel 24 and the like.

The control unit 20 is a processing unit having a CPU, a ROM, a RAM, an input/output interface and the like. The control unit 20 totally controls each element of the multi-function cell phone 2. The control unit 20 executes various application processes and provides a function of a cell phone according to a program and data read out from the ROM and the memory unit 22. The application executed by the control unit 20 includes an application for displaying an image. Further, a power saving mode (or a sleep mode in some cases) for reducing an electric power by limiting a part of functions compared with a normal operation in order to extend the operating time of the battery mounted in the multi-function cell phone 2 is provided. In the present embodiment, the electric power consumption is reduced by restricting the display of the image on the display unit 23 according to the function of the power saving mode. Specifically, when an operation is not performed for a predetermined time interval, the operation is switched to the power saving mode, and the image display, which has been executed, stops (for example, to turn off a backlight of a liquid crystal panel, or the image output is interrupted).

The control unit 20 is communicably connected to the in-vehicle display device 1 via the communication unit 21, so that the terminal mode for functioning in cooperation with each other is executable. Specifically, the control unit 20 supplies the image information, which is displayed on the display unit 23 of the multi-function cell phone 2, to the in-vehicle display device 1. Further, the control unit 20 functions based on the operation signal output from the in-vehicle display device 1. In an example, the control unit 20 supplies the control signal relating to the operation command of the multi-function cell phone 2 to the in-vehicle display device 1. Then, when the control unit 20 receives the operation signal from the in-vehicle display device 1 in response to the supplied control signal, the control unit 20 executes a process corresponding to the operation signal. According to this feature, the operation of the multi-function cell phone 2 is executed by the in-vehicle display device 1.

Further, the control unit 20 executes a process for notifying the transition for the power saving mode to the in-vehicle display device 1 when the terminal mode is switched to the power saving mode. Detailed steps of the process relating to the power saving mode will be explained later.

The communication unit 21 is a communication interface corresponding to predetermined wireless communication standards or predetermined wired communication standards, similar to the communication unit 11 of the in-vehicle display device 1. The memory unit 22 is a storage device provided by a rewritable non-volatile semiconductor memory or the like. The memory unit 22 stores a program and data for functioning the multi-function cell phone 2. The display unit 23 is a color display device such as a liquid crystal display and an organic EL device. The display unit 23 displays an image output from and processed by the control unit 20. The touch panel 24 is a pointing device arranged integrally with a display screen of the display unit 23. The touch panel 24 detects information of a screen position, on which the user touches. The touch panel 24 outputs the information as operation information to the control unit 20. Here, since other functions and a structure of the multi-function cell phone 2 are provided by the prior art, the detailed explanation is skipped.

(Explanation of Process Executed by Multi-Function Cell Phone 2)

Figure 2:
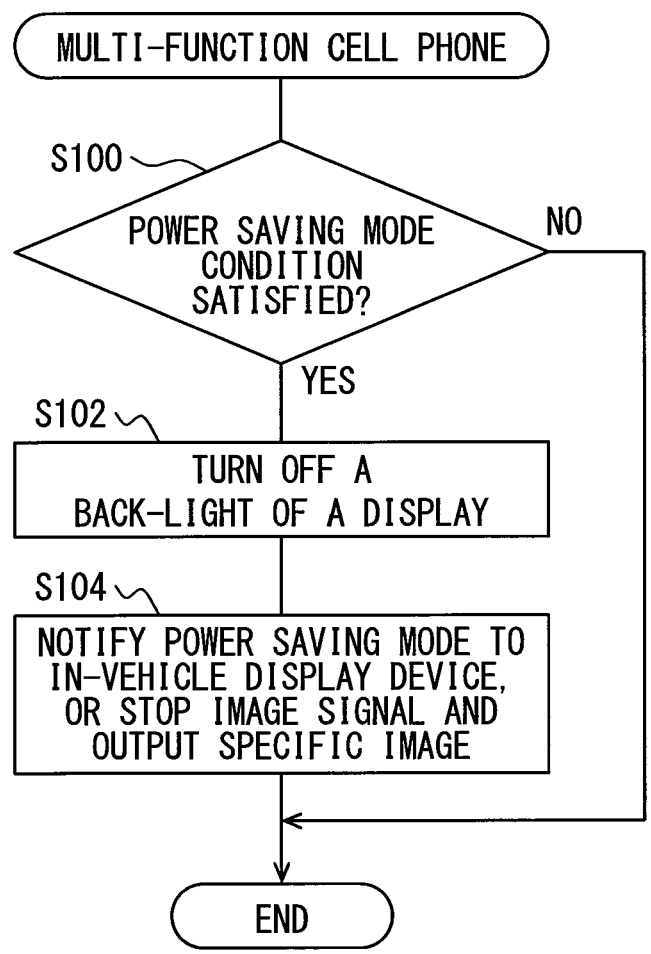
FIG. 2 is a flowchart showing steps of a process executed by a multi-function cell phone.

The steps of the process executed by the control unit 20 of the multi-function cell phone 2 will be explained with reference to a flowchart in FIG. 2. The process is repeatedly executed at predetermined time intervals under a condition that the terminal mode with respect to the in-vehicle display device 1.

At step S100, the control unit 20 determines whether a condition for executing the power saving mode of the multi-function cell phone 2 is satisfied. The condition for executing the power saving mode is, for example, a case where a state that the user does not perform any operation over the multi-function cell phone 2 continues for a predetermined period. When the condition for executing the power saving mode is satisfied (i.e., when the determination of step S100 is "YES"), it goes to step S102. When the condition for switching top the power saving mode is satisfied (i.e., when the determination of step S100 is "NO"), the present process is completed (so that the normal operation mode is executed).

At step S102 in case where the condition for executing the power saving mode is satisfied, the backlight of the display unit 23 is switched off (so that the power saving mode is executed). Alternatively, the image signal supply to the display unit 23 may be interrupted, so that the display unit 23 becomes in a resting mode. At step S104, the control signal for notifying the power saving mode is transmitted to the in-vehicle display device 1 via the communication unit 21. After transmitting the control signal, the present process ends. Here, at step S104, alternatively, the image signal supply to the in-vehicle display device 1 may be interrupted when the power saving mode is executed, or a specific image signal (e.g., indicative of an all white image or an all black image) may be supplied to the in-vehicle display device 1, instead of transmitting the control signal for notifying the power saving mode.

(Explanation of a Process Executed by the in-Vehicle Display Device 1)

Figure 3:
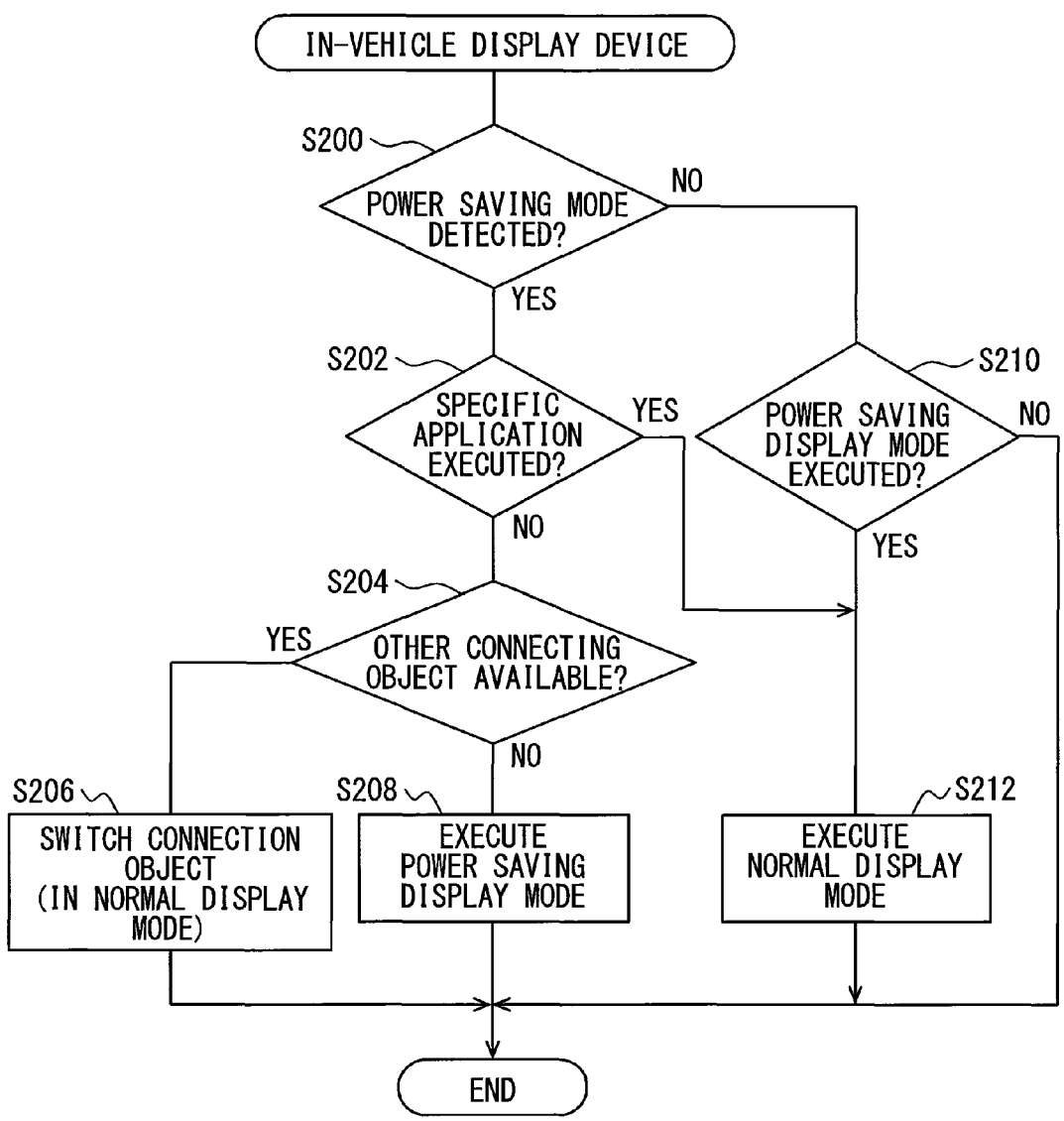
FIG. 3 is a flowchart showing steps of a process executed by an in-vehicle display device.

Steps of a process executed by the control unit 10 of the in-vehicle display device 1 will be explained with reference to a flowchart in FIG. 3. The process is repeatedly executed at every predetermined time interval when the terminal mode with respect to the multi-function cell phone 2 is executed.

At step S200, the control unit 10 detects whether the multi-function cell phone 2 is in the power saving mode. When the unit 10 detects the power saving mode (i.e., when the determination at step S200 is "YES"), it goes to step S202. When the unit 10 detects the normal operation mode instead of the power saving mode (i.e., when the determination at step S200 is "NO"), it goes to step S210. Here, it is possible to detect that the multi-function cell phone 2 is in the power saving mode according to at least one of following two methods.

(1) The power saving mode is detected by receiving the control signal for notifying the power saving mode from the multi-function cell phone 2 via the communication unit 11. Here, the control signal for notifying the power saving mode may be received periodically or at timing when the state is changed.

(2) When the specific image (e.g., the all white image or the all black image) indicated by the image signal received from the multi-function cell phone 2 via the communication unit 11 continues for the predetermined time period, the detection of the power saving mode is decided. Alternatively, when the image signal supply from the multi-function cell phone 2 is stopped, the detection of the power saving mode is decided.

At step S202 in a case where it is detected that the multi-function cell phone 2 is in the power saving mode, the information of an application program being executed by the multi-function cell phone 2 at the present time is obtained via the communication unit 11. Then, it is determined whether the specific application program is running. When the specific application program is running in the multi-function cell phone 2 (i.e., when the determination at step S202 is "YES"), it goes to step S212. On the other hand, when the specific application program is not running in the multi-function cell phone 2 (i.e., when the determination at step S202 is "NO"), it goes to step S204. Here, the specific application program is, for example, an application program for providing a telephone function, a map display and route guiding function, or a sound and moving image reproducing function. These are examples of the specific application program, which is required to display the image on the display of a vehicle side even when the power saving mode is executed.

At step S212 in a case where the specific application program is running in the multi-function cell phone 2, the normal display mode is executed. In the normal display mode, the image supplied from the multi-function cell phone 2 is displayed as usual without performing a step for reducing the electric power consumption such as turning off the backlight of the display unit 12.

On the other hand, at step S204 in a case where the specific application program is not running in the multi-function cell phone 2, it is determined whether any communicable and connectable communication device other than the multi-function cell phone 2, which is communicated and connected currently, exists within a communicable range of the communication unit 11. Here, the other communication device to be searched is an external communication infrastructure such as a base station of a public wireless LAN or another multi-function cell phone 2, which is held by a passenger of a vehicle. The other communication device to be searched is registered in the in-vehicle display device 1. When the other communicable and connectable communication device exists (i.e., when the determination at step S204 is "YES"), it goes to step S206. On the other hand, when the other communicable and connectable communication device does not exist (i.e., when the determination at step S204 is "NO"), it goes to step S208.

At step S206 in a case where the other communicable and connectable communication device exists, a destination connection object is switched from the multi-function cell phone 2, which has been communicated and connected, to the other communicable and connectable communication device (i.e., the other multi-function cell phone 2 or the wireless base station). When the other multi-function cell phone 2 is communicated and connected, the other multi-function cell phone 2 functions together in the terminal mode, so that the image information supplied from the connection object is displayed on the display unit 12 in the normal display mode. When the other wireless base station is communicated and connected, the communication services are received from the other wireless base station, so that the image information obtained from the other wireless base station is displayed on the display unit 12 in the normal display mode.

On the other hand, at step S208 in a case where the other communicable and connectable communication device does not exist, the power saving display mode for reducing the electric power consumption relating to the image display operation of the display unit 12 is executed. Specifically, a step for turning off the backlight of the display unit 12 or the like is executed.

At step S210 in a case where it is detected at step S200 that the multi-function cell phone 2 is in the normal display mode instead of the power saving mode, it is determined whether the power saving display mode is being executed in the in-vehicle display device 1 at the present time. When the power saving display mode is not being executed at the present time (i.e., when the determination at step S210 is "NO"), the present process ends. On the other hand, when the power saving display mode is being executed at the present time (i.e., when the determination at step S210 is "YES"), it goes to step S212. At step S212, the power saving display mode at the present time is terminated, and the normal display mode is executed. Thus, the step for reducing the electric power consumption such as turning off the backlight of the display unit 12 is terminated, and the image supplied from the multi-function cell phone 2 is displayed as usual.

(Other Options Applicable to the in-Vehicle Display Device 1)

Other options applicable to the in-vehicle display device 1 will be described as follows.

(1) When the input unit 14 detects the operation from the user while the power saving display mode is being executed by the in-vehicle display device 1, the power saving mode may be returned to the normal display mode. In this case, the operation signal received by the input unit 14 may be transmitted to the multi-function cell phone 2 via the communication unit 11.

(2) When the control unit 10 determines based on the charge state of the secondary battery of the vehicle that further power saving operation is necessary, in addition to the execution of the power saving display mode, the operation may be switched to a standby state for stopping functions other than a communication function of the communication unit 11 and a user operation receiving function of the input unit 14 and the touch panel 15. In this case, the electric power consumption of a whole of the in-vehicle display device 1 is much reduced if necessary. In this case, when it is detected via the communication unit 11 that the multi-function cell phone 2 is returned to the normal display mode, or when it is detected that the operation from the user is detected via the input unit 14, the in-vehicle display device 1 activates all functions.

(3) The control unit 10 may obtain the charge state of the secondary battery for driving of an electric vehicle or the like from a ECU of the vehicle, and the control unit 10 determines according to the charge state whether it is necessary to move to the power saving display mode. For example, when the secondary battery for driving is in a regenerative charging state, the control unit 10 determines not to execute the power saving display mode even though it is detected that the multi-function cell phone 2 is in the power saving mode.

(4) When the multi-function cell phone 2 is switched to the power saving mode, the user may appropriately set such that the display image on the display unit 12 is switched to other image and sound source (i.e., a map, an image and music) equipped in the vehicle. In this case, when the multi-function cell phone 2 is switched to the power saving mode, the control unit 10 switches the display image on the display unit 12 from the image information supplied by the multi-function cell phone 2 to an image, which is preliminary set by the user as an image and sound source.

(5) In association with the transition of the multi-function cell phone 2 to the power saving mode, the user may appropriately set whether the in-vehicle display device 1 is switched to the power saving display mode.

(Effects)

The in-vehicle display device 1 according to the present embodiment provides the following effects.

In association with the transition of the multi-function cell phone 2 to the power saving mode when the phone 2 is in cooperation with the in-vehicle display device 1 in the terminal mode, the control unit 10 of the in-vehicle display device 1 is switched to the power saving display mode for reducing the electric power consumption of the display unit 12 on the vehicle side. In this case, the waste electric power consumption such that the vehicular display continues to function although the image display is stopped according to the power saving mode on the multi-function cell phone 2 is reduced.

The control unit 10 of the in-vehicle display device 1 detects that the multi-function cell phone 2 is returned from the power saving mode to the normal operation mode while the power saving display mode is executed, the control unit 10 returns the display image of the display unit 12 from the power saving display mode to the normal display mode. Thus, in association with the multi-function cell phone 2 that returns to the normal operation mode, the in-vehicle display device 1 returns from the power saving display mode to the normal display mode.

The control unit 10 of the in-vehicle display device 1 returns the display image of the display unit 12 from the power saving display mode to the normal display mode when the control unit 10 receives the input operation from the user via the input unit 14 while the power saving display mode is executed. Thus, when it is necessary for the user to operate, the in-vehicle display device 1 returns from the power saving display mode to the normal display mode.

The control unit 10 of the in-vehicle display device 1 changes a communication connection destination object to the other communication device when the communicable and connectable other communication device exists under a condition that the multi-function cell phone 2 is in the power saving mode. Thus, the control unit 10 controls the display unit 12 to display the image information supplied from the other communication device. Thus, the image of another communication connection destination object instead of the multi-function cell phone 2, which stops displaying the image, is displayed. Specifically, when the multi-function cell phone 2 is in the power saving mode, an opportunity for displaying the image information is effectively available without waste using a method different from a method for reducing the electric power consumption relating to the display image of the display unit 12.

When the control unit 10 detects that the multi-function cell phone 2 is in the power saving mode, the control unit 10 of the in-vehicle display device 1 determines according to a type of the application program being executed in the multi-function cell phone 2 whether it is necessary to switch to the power saving display mode. For example, when the specific application program is running in the multi-function cell phone 2, the in-vehicle display device 1 executes the image display in the normal display mode even if the multi-function cell phone 2 is switched to the power saving mode. In this case, it is convenient for a case where it is necessary to display the image in the specific application program on the display of the vehicle side even when the multi-function cell phone 2 is in the power saving mode.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle display device communicably coupled with a mobile information terminal and displaying image information input from the mobile information terminal on a vehicular display mounted on a vehicle, the in-vehicle display device comprising:
    a mode detecting device that detects whether the mobile information terminal is in a normal operation mode or a power saving mode for reducing an electric power consumption relating to image display; and
    a display control device that changes a display mode of the vehicular display from a normal display mode to a power saving display mode for reducing an electric power consumption relating to the image display according to a detection result of the mode detecting device under a condition that the mobile information terminal is switched from the normal operation mode to the power saving mode.

2. The in-vehicle display device according to claim 1, wherein the display control device returns the display mode of the vehicular display from the power saving display mode to the normal display mode under a condition that the mobile information terminal returns from the power saving mode to the normal operation mode when the vehicular display is controlled in the power saving display mode.

3. The in-vehicle display device according to claim 1 further comprising:
    an input device that receives an input operation of a user, wherein the display control device returns the display mode of the vehicular display from the power saving display mode to the normal display mode under a condition that the input device receives the input operation of the user when the vehicular display is controlled in the power saving display mode.

4. The in-vehicle display device according to claim 1, wherein the display control device changes a communication connection destination object to another communicable and connectable communication device; under a condition that the mobile information terminal is in the power saving mode when the another communicable and connectable communication device other than the mobile information terminal exists, and wherein the display control device changes the display mode of the vehicular display from the normal display mode to the power saving display mode under a condition that the mobile information terminal is in the power saving mode when the another communicable and connectable communication device does not exist.

5. The in-vehicle display device according to claim 1, wherein the display control device determines based on a type of an application program executed in the mobile information terminal whether it is necessary to switch to the power saving display mode under a condition that the mobile information terminal is in the power saving mode.

6. A non-transitory tangible computer readable medium comprising instructions for execution by a computer, the instructions providing a computer-implemented method for displaying image information input from a mobile information terminal on a vehicular display mounted on a vehicle, the instructions comprising:

detecting whether the mobile information terminal is in a normal operation mode or a power saving mode for reducing an electric power consumption relating to image display; and changing a display mode of the vehicular display from a normal display mode to a power saving display mode for reducing an electric power consumption relating to the image display under a condition that the mobile information terminal is switched from the normal operation mode to the power saving mode.

7. A method for displaying image information input from a mobile information terminal on a vehicular display mounted on a vehicle, the method for displaying on the vehicular display comprising:

detecting whether the mobile information terminal is in a normal operation mode or a power saving mode for reducing an electric power consumption relating to image display; and changing a display mode of the vehicular display from a normal display mode to a power saving display mode for reducing an electric power consumption relating to the image display under a condition that the mobile information terminal is switched from the normal operation mode to the power saving mode.

* * * * *